US 10,550,786 B1

(12) United States Patent
Haskara et al.

(10) Patent No.: US 10,550,786 B1
(45) Date of Patent: Feb. 4, 2020

(54) PREDICTIVE TORQUE MANAGEMENT FOR POWERTRAIN HAVING CONTINUOUS ACTUATORS AND MULTIPLE DISCRETE MODES

(71) Applicant: GM Global Technology Operations LLC, Detroit, MI (US)

(72) Inventors: Ibrahim Haskara, Macomb, MI (US); Chen-fang Chang, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/149,194

(22) Filed: Oct. 2, 2018

(51) Int. Cl.
*F02D 41/24* (2006.01)
*F02D 41/14* (2006.01)
*F02D 41/00* (2006.01)
*F02D 17/02* (2006.01)

(52) U.S. Cl.
CPC ......... *F02D 41/1402* (2013.01); *F02D 17/02* (2013.01); *F02D 41/0087* (2013.01); *F02D 41/1406* (2013.01); *F02D 2041/1412* (2013.01); *F02D 2041/1436* (2013.01)

(58) Field of Classification Search
CPC ............ F02D 41/1402; F02D 41/1406; F02D 41/0087; F02D 17/02; F02D 2041/1412; F02D 2041/1436
USPC .................. 123/198 F, 481, 436, 399, 90.15; 701/106, 103, 110
See application file for complete search history.

(56) References Cited

U.S. PATENT DOCUMENTS

| 4,489,695 | A | 12/1984 | Kohama et al. |
| 5,048,495 | A | 9/1991 | Onari et al. |
| 6,953,024 | B2 * | 10/2005 | Linna ................. F02B 1/12 123/406.24 |
| 7,577,511 | B1 | 8/2009 | Tripathi et al. |
| 8,845,481 | B2 * | 9/2014 | Whitney ............... B60K 6/48 477/5 |
| 9,849,880 | B2 * | 12/2017 | D'Amato ........... B60W 30/143 |
| 2010/0108028 | A1 | 5/2010 | Aso |
| 2012/0046853 | A1 | 2/2012 | Silvestri et al. |

\* cited by examiner

*Primary Examiner* — Hai H Huynh
(74) *Attorney, Agent, or Firm* — Quinn IP Law

(57) ABSTRACT

A method controls multiple continuous actuators to achieve a discrete mode of operation in a system. The method may include determining a desired output state of the system, including processing a control input set for the multiple continuous actuators via a dynamical predictive model of the system, and then processing the control input set via the dynamical predictive model to determine possible control solutions for achieving the desired output state of the system at a calibrated future time point. The method may include using a cost function logic block to identify, from among the possible control solutions, a lowest-cost control solution for executing the discrete mode at the future time point, processing the lowest-cost control solution through a real-time optimization logic block to determine an optimized solution for the discrete mode, and then executing the optimized solution at the future time point.

20 Claims, 4 Drawing Sheets

PREDICTIVE TORQUE MANAGEMENT FOR POWERTRAIN HAVING CONTINUOUS ACTUATORS AND MULTIPLE DISCRETE MODES

INTRODUCTION

An internal combustion engine may be coupled to a planetary transmission in a powertrain system. A powertrain includes multiple actuators. An operating point of the engine, for instance, is determined by actuators in the form of a throttle, fuel injectors, intake and exhaust valves, and a camshaft. Because such actuators have continuously variable outputs, they may be referred to as continuous actuators. Certain powertrain components are capable of operating in discrete modes, such as a fixed gear state of the transmission. In some powertrain configurations it is also possible to increase fuel economy by selectively deactivating some of the engine's combustion cylinders. The number of active cylinders, i.e., the particular cylinders that remain fueled and fired at a given operating point, is likewise a discrete quantity, and is thus another example of a discrete mode.

SUMMARY

A hybrid control problem is present when one or more continuous actuators are used to control transitions to or from a discrete mode of operation. Given the vast number of control variables at play in a complex dynamical system such as a powertrain, it is difficult to accurately and efficiently calibrate a robust control solution to the hybrid control problem using preprogrammed lookup tables or mode transition schedules. Mode transition efficiency affects the noisiness or feel of a given mode transition, i.e., the presence or absence of perceptible torque transients imparted to the powertrain's driveline during the mode transition. The present disclosure is directed to improving upon the transient torque performance of an example powertrain when faced with the above-noted hybrid control problem.

In an illustrative example implementation, a discrete mode that is selected and controlled in real-time via one or more continuous actuators is the number of engine cylinders fueled and fired at a given engine operating point. With respect to selective cylinder deactivation, in general the number of fired cylinders is traditionally scheduled using lookup tables populated with a corresponding number of active cylinders over multiple corresponding engine operating points. Ad-hoc mode switching logic may be used in an attempt at minimizing torque transients imparted at the moment of cylinder deactivation or reactivation.

For instance, during selective cylinder deactivation a lookup table may call for an "up-switch event" in which a specified number of additional cylinders are fueled and fired while a controller simultaneously retards spark, thereby maintaining engine torque that would otherwise increase. When fewer cylinders are called for during a "down-switch event", manifold air pressure may be increased in conjunction with a predetermined level of spark retard. The increase in manifold air pressure helps maintain a desired level of engine torque, with valve switching occurring in response to manifold air pressure rising to a level that is sufficient for maintaining engine torque using the scheduled reduced number of cylinders. Such an approach relies on preprogrammed control results, and thus can be difficult to effectively and thoroughly calibrate. The ultimate control result is thus largely dependent upon the quality of calibration data contained in the populated tables.

In contrast, the present strategy uses forward-looking model-based logic to achieve a predictive/look-ahead control framework in which discrete operating modes, such as but not limited to the number of fired engine cylinders or a fixed transmission gear state, are determined in real time in coordination with control of the continuous actuators. Fundamental to the present control logic is the integrated and coordinated use of (i) a dynamical predictive model logic block, (ii) a tunable cost function formulation logic block, and (iii) a real-time optimization logic block.

In an example embodiment, a method for controlling multiple continuous actuators in a system to achieve a discrete mode of operation in the system includes providing a plurality of control inputs of the multiple continuous actuators to a dynamical predictive model of the system, with the control inputs collectively describing a desired output state of the system. The method also includes determining a set of possible control solutions for achieving the desired output state of the system at a future time point using the dynamical predictive model, and then using a cost function logic block of a controller to identify, from among the possible control solutions, a lowest opportunity cost control solution for executing the discrete mode of operation at the future time point. This process occurs continuously, such that the controller is continuously looking ahead to the next future time point and adapting in real-time to the changing input set.

The method additionally includes processing the lowest opportunity cost control solution through a real-time optimization logic block of the controller to determine an optimized solution for implementing the discrete mode of operation, and thereafter executing the optimized solution via the controller to thereby transition the system to the discrete mode of operation at the future time point.

The system may include an internal combustion engine, with the continuous actuators including a throttle and a fuel injector of the engine, and the discrete mode of operation including a number of active cylinders of the engine.

The cost function logic block determines the lowest-cost control solution based on fuel economy of the engine. The controller may minimize the number of active cylinders while maintaining torque from the engine at a predetermined level.

The cost function may include future torque demand for a forward-looking prediction horizon inclusive of the future time point.

The control input set may include the throttle, a waste gate position, a fuel timing and quantity, and variable valve timing of the engine.

The system may include, in other embodiments, an internal combustion engine and a transmission connectable to the engine via an input clutch. The continuous actuators in this instance may include a throttle and a fuel injector of the engine, and the discrete mode of operation may include a gear state of the transmission.

Processing the lowest-cost control solution through a real-time optimization logic block includes, in some embodiments, using a hybrid solver selected from convex optimization, quadratic programming, and mixed-integer quadratic programming.

The hybrid solver may optionally select from the convex optimization, the quadratic programming, and the mixed-integer quadratic programming options based on a load and a speed of the system.

Processing the lowest opportunity cost control solution through a real-time optimization logic block may include using a round-off feature in which the controller uses convex quadratic programming across an entire range of the set of possible control solutions to find an optimal solution, truncates the optimal solution to a closest-possible value, and uses the closest-possible value as the optimized solution when executing the discrete mode.

Also disclosed is a system having discrete modes of operating. The system includes multiple continuous actuators configured to achieve the discrete modes of operation, and a controller configured as set forth above.

The above-noted features and advantages and other features and advantages of the present disclosure are readily apparent from the following detailed description of the best modes for carrying out the disclosure when taken in connection with the accompanying drawings.

Figure 1:
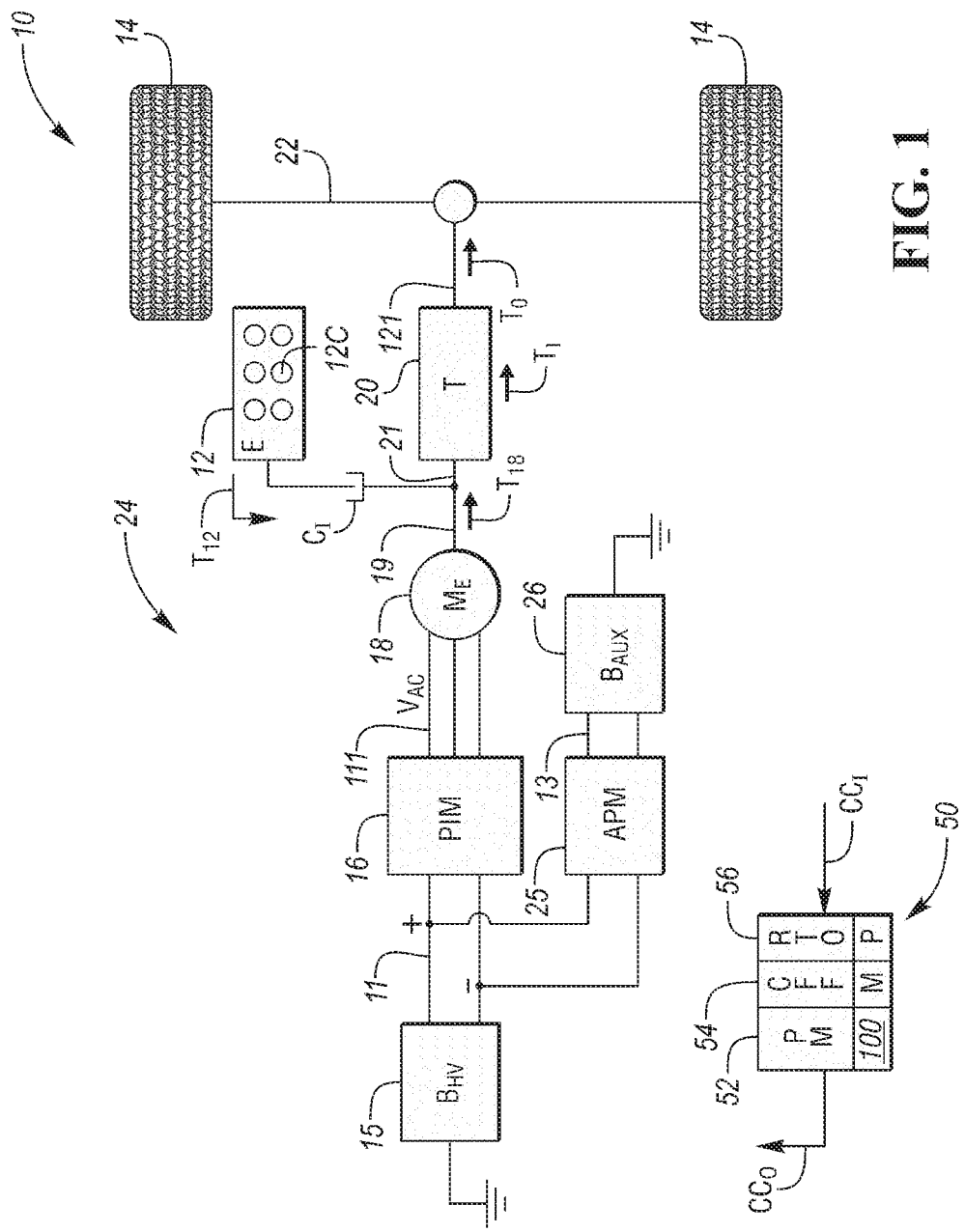
FIG. 1 is a schematic illustration of an example vehicle having a powertrain and a controller, with the controller providing a predictive model-based hybrid control architecture as set forth herein.

The present disclosure is susceptible to various modifications and alternative forms, and some representative embodiments have been shown by way of example in the drawings and will be described in detail herein. However, novel aspects of the disclosure are not limited to the particular forms illustrated in the appended drawings. Rather, the disclosure is to cover modifications, equivalents, combinations, and/or alternatives falling within the scope of the disclosure as defined by the appended claims.

DETAILED DESCRIPTION

Referring to the drawings, wherein like reference numbers refer to the same or like components in the several Figures, an example vehicle 10 is depicted in FIG. 1. While for illustrative consistency the vehicle 10 is described below with reference to the various Figures, the present teachings may be advantageously applied to other dynamical systems, whether vehicular (automotive, watercraft, aircraft, rail vehicles, etc.) or non-vehicular, such as stationary power plants.

The example vehicle 10 of FIG. 1 includes an internal combustion engine (E) 12, a transmission (T) 20, and a controller 50. As detailed below with particular reference to FIGS. 2-6C, the controller 50 uses a forward-looking/predictive model-based approach to finding an opportunity cost-optimized solution to the above-noted hybrid control problem, with the cost weighted by the particular factor or factors of importance, e.g., fuel economy tradeoff relative to torque performance of the engine 12. That is, the controller 50 is configured to automatically transition between different discrete modes of operation, and to optionally determine precisely when to initiate such a transition, using blended control of one or more continuous actuators. As a desired control result, the efficiency and feel of the transition between discrete modes is improved relative to existing lookup table or ad-hoc programming approaches, with a resultant reduction in noise, vibration, and harshness during the transitions.

In an example illustration, the engine 12 may have continuous actuators in the form of throttle, fuel injectors controlling the fuel injection quantity, cam position, and/or variable valve position on the intakes and exhaust of the various cylinders 12C of the engine 12. A discrete mode for the purposes of illustration may be the number of cylinders 12C that are fueled and fired, i.e., the number of active cylinders 12C. Other continuous actuators may be envisioned within the scope of the disclosure, including a fixed gear state of the transmission 20, e.g., $1^{st}$ gear, $2^{nd}$ gear, $3^{rd}$ gear, etc. Operation of the controller 50 is described in further detail below with reference to FIGS. 2-6C, with such operation not limited to vehicular or powertrain use.

Further with respect to the example vehicle 10 of FIG. 1, the engine 12 may be selectively connected to the transmission 20 via an input clutch ($C_I$), such as a friction clutch or a hydrodynamic torque converter assembly. Firing of the cylinders 12C of the engine 12 is configured to generate engine torque (arrow $T_{12}$), with the engine torque (arrow $T_{12}$) transmitted via the input clutch ($C_I$) to an input member 21 of the transmission 20. An output member 121 of the transmission 20 transmits output torque (arrow $T_O$) to one or more drive axles 22, with the drive axles 22 coupled to a set of drive wheels 14. In such an embodiment, the engine 12, the transmission 20, and other coupled components and control structure, including the controller 50, collectively form a powertrain system 24. Maintenance of the engine torque (arrow $T_{12}$) through a mode transition with minimal torque disturbance is thus a benefit of the present approach.

In an optional electrified variation of the vehicle 10, a high-voltage battery pack ($B_{HV}$) 15 may be electrically connected to a power inverter module (PIM) 16 via a high-voltage DC voltage bus 11. The PIM 16 may be controlled via PWM voltage control signals from the controller 50 or another control unit to output an alternating current voltage ($V_{AC}$) via a high-voltage AC voltage bus 111. In turn, phase windings of an electric machine ($M_E$) 18 may be energized via the AC voltage bus 111 to generate motor torque (arrow $T_{18}$) via a rotor 19, with the motor torque (arrow $T_{18}$) transmitted to the transmission 20 as part or all of an input torque (arrow $T_I$) in some embodiments. An auxiliary power module (APM) 25 may be connected to the high-voltage bus 11, and may be configured as a DC-DC converter to output a low/auxiliary voltage via an auxiliary voltage bus 13. An auxiliary battery ($B_{AUX}$) 26 may be connected to the auxiliary voltage bus 13. In the example embodiment of FIG. 1, the electric machine 18, when part of the powertrain system 24, would form another continuous actuator within the context of the disclosure.

In order to perform the hybrid blending and control functions in accordance with the present disclosure, the controller 50 of FIG. 1 is programmed with a Predictive Model (PM) 52, a Cost Function Formulation (CFF) logic module 54, and a Real-Time Optimization (RTO) logic module 56. The controller 50 receives control inputs (arrow $CC_I$) in real time, with the controller 50 having a processor (P) and memory (M). The memory (M) includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock and counter, analog-to-digital and digital-to-analog circuitry, and input/output circuitry and devices, as well as appropriate signal conditioning and buffer circuitry. Execution of instructions 100 enables the controller 50 to automatically generate and transmit control output signals (arrow $CC_O$) to the powertrain 24 to control operation of the engine 12, the transmission 20, or other components of the powertrain system 24.

Figure 2:
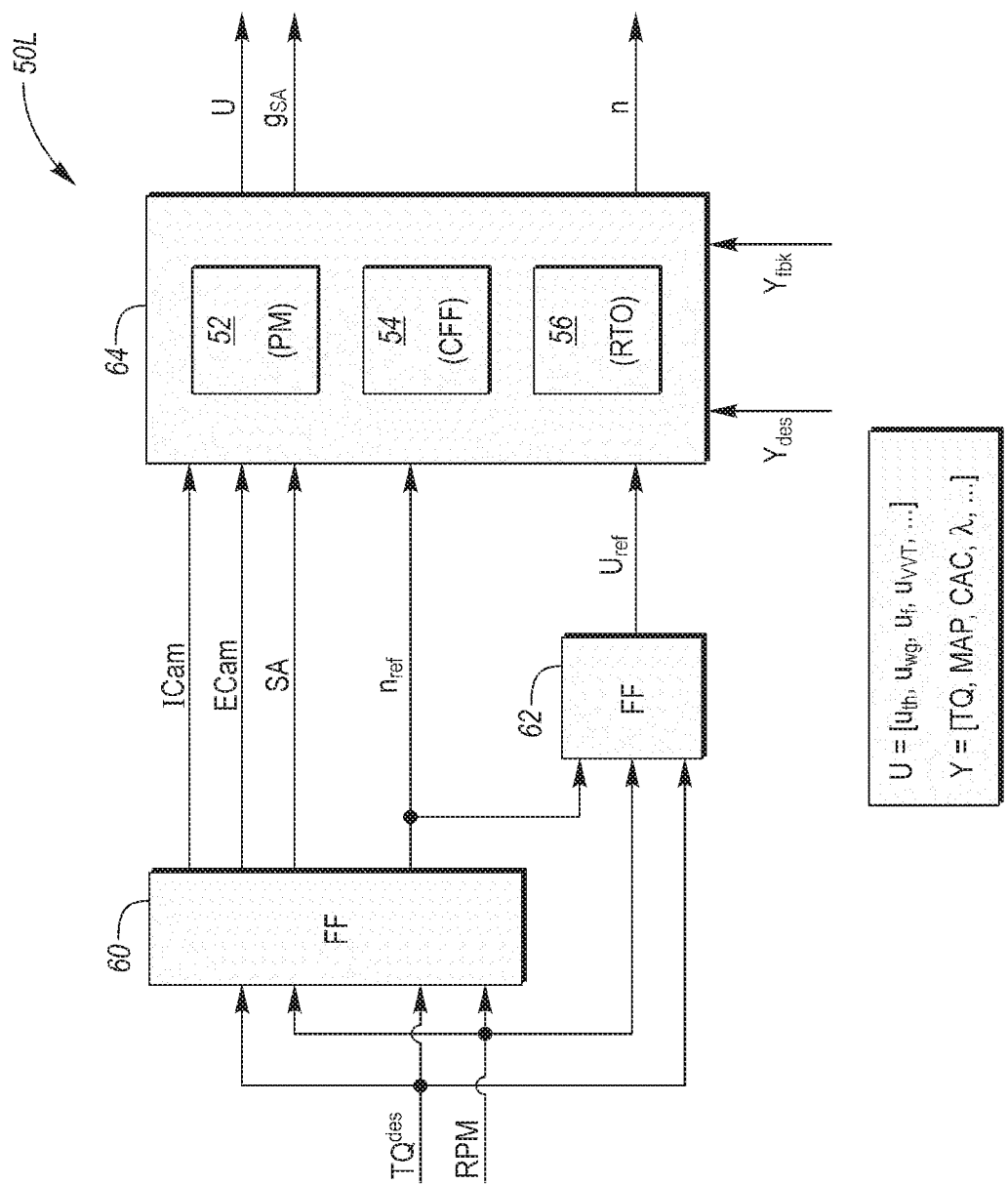
FIG. 2 is a schematic logic flow diagram for the controller of FIG. 1.

The controller 50 shown schematically in FIG. 1 is configured to execute the instructions 100 via embedded control logic 50L, the logic flow of which is depicted schematically in FIG. 2. The control logic 50L in an example embodiment includes feed-forward (FF) logic blocks 60 and 62 and a hybrid control block 64. Variables used in the examples set forth in FIGS. 2-6C are non-limiting, and therefore are intended to demonstrate the present teachings in the context of an exemplary illustration in which the continuous actuators are those of the engine 12 of FIG. 1. In such an embodiment, a representative control input set (U) to the engine 12 representative or responsive to a user-requested or autonomously-requested engine torque (arrow $T_{12}$) and/or output torque (arrow $T_O$) may include variables as throttle ($u_{th}$), waste gate position ($u_{wg}$), fuel timing and quantity ($u_f$), variable valve timing ($u_{VVT}$), and/or other suitable inputs. The manner in which the engine 12 ultimately responds, or a control output set (Y), is captured by such values as torque (TQ), manifold air pressure (MAP), cylinder air charge (CAC), air-fuel ratio ($\lambda$), etc.

In the exemplary control logic 50L shown in FIG. 2, a desired torque ($TQ^{des}$) and engine speed (RPM) may be fed into the feed-forward logic blocks 60 and 62. From the desired values, the controller 50 may determine, e.g., from a lookup table, a corresponding set of output values. For instance, the feed-forward logic block 60 may output timing of intake and exhaust cams (ICam and ECam, respectively) of the engine 12, as well as a spark advance (SA) value, which is also a timing quantity. In the example embodiment in which the discrete mode being controlled is the number of cylinders 12C of the engine 12 as shown in FIG. 1, the feed-forward logic block 60 may also output a nominal number of active cylinders 12C ($n_{ref}$) required to meet the input demands. From the various input values, the feed-forward logic block 62 may determine a reference input set ($U_{ref}$) to the engine 12, with $U_{ref}$ being example reference values, absent the hybrid control block 64, that the controller 50 would ordinarily expect to command from associated continuous actuators of the engine 12.

Within the flow of the control logic 50L, the hybrid control logic 64 receives various lookup table or functional outputs from the feed-forward logic block 60, the reference input set ($U_{ref}$) from the feed-forward logic block 62, and desired and feedback/sensed inputs ($Y_{des}$ and $Y_{fbk}$), respectively. The hybrid control logic 64 ultimately determines and outputs control input set (U) to the continuous actuators and also outputs a mode decision (n), with the value (n) in this instance being the number of active cylinders 12C of the engine 12, which in turn may be an integer or a fractional value at any discrete moment in time. The hybrid control logic 64 may also output a spark advance gain ($gs_A$) as a value between 0 and 1 representative of the amount of spark retard on engine torque, e.g., $gs_A$=0.5 leading to a torque reduction of 50 percent.

With respect to the illustrated hybrid control logic 64 of FIG. 2, the controller 50 of FIG. 1 enacts predictive control of the powertrain 24 based on real-time optimization, via the RTO module 56, of an opportunity cost function enacted via the CFF module 54, all of which is subject to a dynamic predictive model embodied by the PM 52 and other operating constraints.

Referring first to the PM 52 of FIG. 2, the PM 52 embodies a dynamical prediction model of the controlled system, such as the vehicle 10 or powertrain 24 of FIG. 1 in the present illustration. Such a prediction model may be expressed mathematically as follows:

$$\frac{d}{dt}\begin{bmatrix} P_{im} \\ \phi \end{bmatrix} = A(\rho, n_{cyl})\begin{bmatrix} P_{im} \\ \phi \end{bmatrix} + B(\rho, n_{cyl})\begin{bmatrix} u_{th} \\ CFC \end{bmatrix}$$

Here, A and B are original system matrices with $n_{cyl}$ used as a model parameter. For instance:

$$Ac(\rho) = \begin{bmatrix} \frac{-n_{cyl}V_{cyl}\eta(P_{im}, N, ICam, ECam)N}{120V_{im}} & 0 \\ 0 & -\frac{1}{\tau_\lambda} \end{bmatrix}$$

$$Bc(\rho) = \begin{bmatrix} \frac{\sqrt{R}\,T_{im}P_{amb}N}{\sqrt{T_{amb}}\,V_{im}}\Psi\left(\frac{P_{im}}{P_{amb}}\right)A_{th}(P_{im}) & 0 \\ 0 & \frac{AFR_s}{\tau_\lambda CAC_{cyl}} \end{bmatrix}$$

with $\tau\lambda$ being a time constant, $R_S$ being a gas constant, CFC and CAC being an amount of cylinder fuel charge and cylinder air charge, respectively, $A_{th}$ representing an effective area of throttle, $\eta$ referring to volumetric efficiency, $\psi$ being a nonlinear function of the pressure ratio across the throttle, i.e., in the form of an orifice equation, $\phi$ being an equivalence ratio, $P_{im}$ referring to intake manifold pressure, $T_{amb}$ being ambient temperature, and $T_{im}$ representing the input manifold temperature. Additionally, N in the above equation is the engine speed corresponding to engine 12 of FIG. 1, $V_{im}$ is the intake manifold volume, $V_{cyl}$ is the cylinder displacement volume, and AFRs is the stoichiometric air-fuel ratio. The variable vector p defines the set of real-time control data and measurements, e.g., $\rho$=(N, $P_{im}$, ICam, ECam, $T_{im}$, $P_{amb}$, $T_{amb}$). In other words, the original system matrices are parameterized by the variable vector, p, which can be updated in real-time. The torque output of the engine 12 may be determined as a function of the states, including CAC, CFC, SA, and the $\rho$ vector noted above.

A control programming challenge is presented by the above mathematical representations because some values, such as the number of cylinders ($n_{cyl}$), may not show up as a control input per se, but remains a parameter affecting system dynamics. Instead, the number of active cylinders 12C may be determined in real time as a mode decision via the hybrid logic module 64. Thus, model reformatting may be performed using analytical or linearization introduce the relationship of $n_{cyl}$=1+$n_{cyl,B}$ in order to transform the above equation into the following equation, with the value $n_{cyl,B}$ thereafter acting like a control input:

$$\frac{d}{dt}\begin{bmatrix} P_{im} \\ \phi \end{bmatrix} = \overline{A}_c(\rho)\begin{bmatrix} P_{im} \\ \phi \end{bmatrix} + \overline{B}_c(\rho)\begin{bmatrix} u_{th} \\ CFC \\ n_{cyl,B} \end{bmatrix}$$

Thus, system matrices with the number of active cylinders 12C ($n_{cyl}$) now transformed to the input realm may be expressed as follows:

$$\overline{A}_c(\rho) = \begin{bmatrix} -\frac{V_{cyl}\eta(P_{im}, N, ICam, ECam)N}{120 V_{im}} & 0 \\ 0 & -\frac{1}{\tau_\lambda} \end{bmatrix}$$

$$\overline{B}_c(\rho) =$$

$$\begin{bmatrix} -\frac{\sqrt{R}\, T_{im} P_{amb} N}{\sqrt{T_{amb}}\, V_{im}} \Psi\left(\frac{P_{im}}{P_{amb}}\right) A_{th}(P_{im}) & 0 & -\frac{V_{cyl}\eta(P_{im}, N, ICam, ECam)N}{120 V_{im}} \\ 0 & \frac{AFR_s}{\tau_\lambda CAC_{cyl}} & 0 \end{bmatrix}$$

While the number of cylinders 12C is described as an output to be determined by the controller 50 in this instance, quasi-hybrid solutions may enable active cylinder deactivation if such a switching decision is predetermined. In such an embodiment, the number of cylinders 12C may be used as a control input.

With respect to the cost function formulation (CFF) module 54 of FIG. 2, this logic block establishes a calibratable cost tradeoff when managing torque of the powertrain 24 of FIG. 1 with enforced fuel economy optimization, and thus acts as an integrated mode decision tool and discrete mode switch. The CFF module 54 establishes a unique cost function (J), e.g., $$J = \sum_{t}^{t+N} [e_p^T e_p + (u - u_{ref})^T R(u - u_{ref}) + FE]$$

The controller 50 thus seeks to minimize the cost J and combine torque tracking with the entire set of control inputs, including in this example the number of cylinders ($n_{cyl}$) and fuel economy (FE).

Part of the above cost function is a predicted error ($e_p$) in vector form and its transpose (T), i.e., $e_p^T$:

$$e_p = P(z^{-1})[Y_{des} - Y_{fbk}]$$

with $P(z^{-1})$ being a dynamic design parameter/filter to smooth the error vector $[Y_{des} - Y_{fbk}]$, which in turn is the difference between the desired outputs and the measured outputs. Thus, the CFF module 54 factors future torque demand (time t to time t+N) into the cost and control references within a given forward-looking prediction horizon of size N. The deviation of the final control input vector, u, from its corresponding nominal reference values, denoted by $u_{ref}$, are also captured in the overall cost function, J.

With respect to fuel economy (FE) in particular, and in keeping with the non-limiting example embodiment of control of the engine 12 in an illustrative active cylinder deactivation scenario, ideally the CFF module 54 seeks to minimize CAC or $n_{cyl}$ while still providing the same torque from the engine 12 of FIG. 1.

$$FE = f[W_1(z^{-1})CAC, W_2(z^{-1})ncyl, \ldots]$$

with $W_1$, $W_2$, etc., being filters or cost penalties. The CFF module 54 may optionally incorporate switch business penalties, e.g., by penalizing changes in the number of engine cylinders or by using other noise metrics as additional terms in the cost function.

Figure 3A:
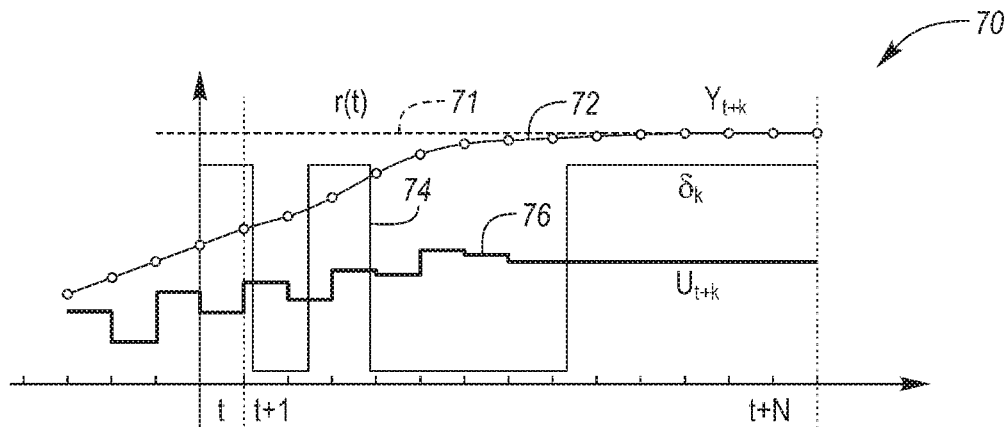
FIGS. 3A and 3B are representative time plots of predicted and manipulated torque outputs for an engine of the vehicle shown in FIG. 1.
Figure 3B:
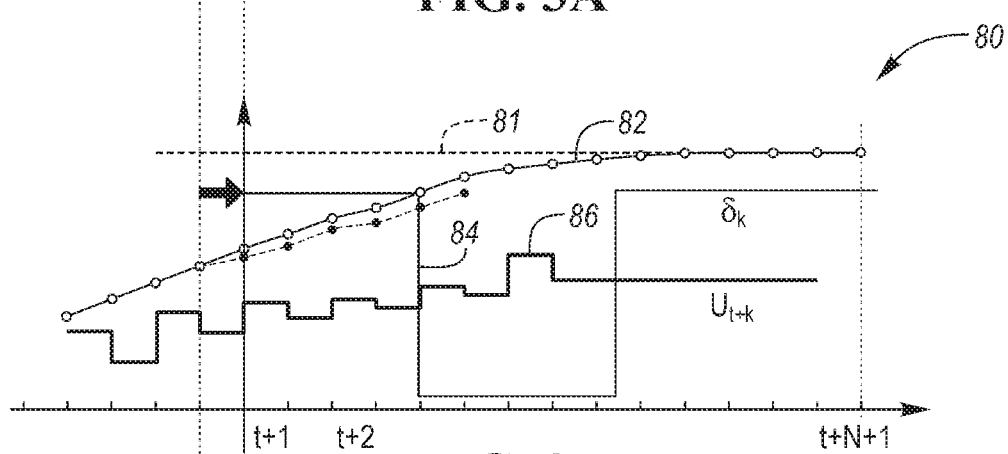

FIGS. 3A and 3B demonstrate the underlying look-ahead principle of operation of the CFF module 54. FIG. 3A and its constituent trace set 70 being one time-step earlier (N−1) than FIG. 3B as shown. In FIG. 3A, line 71 represents a desired value r(t), e.g., torque from engine 12, trace 72 being an output value such as engine torque, trace 74 being a possible discrete mode output 6k, such as the number of cylinders 12C, and trace 76 being a manipulated continuous output, e.g., throttle or another continuous actuator. The control determines the optimal sequences for the continuous and discrete control inputs at every time step, and the values at time t are applied to the engine. As one moves from FIG. 3A to FIG. 3B and trace set 80, with traces 81, 82, 84, and 86 corresponding to traces 71, 72, 74, and 76 of FIG. 3A, the nature of the predicted outputs changes, along with the optimal control values that would minimize the cumulative cost. The controller 50 therefore modifies the manipulated outputs in real time using the control logic 50L of FIG. 2.

The real-time optimization (RTO) module 56 of FIG. 2 embodies a real-time optimizer and thus is configured to determine an optimal future control sequence for minimizing the cost function (J) described above. In other words, the RTO module 56 optimizes a particular control set (U) that combines the values for continuous control sequences and discrete mode sequences by minimizing the cost (J) of implementing such a control set. Various options exist for implementing the RTO module 56, including using a base hybrid solver, a dwell-time feature, and a round-off feature.

Figure 4:
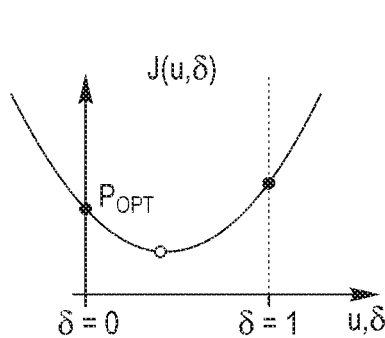
FIG. 4 is a schematic depiction of an example optimized solution generated by the controller of FIG. 2.
Figure 5:
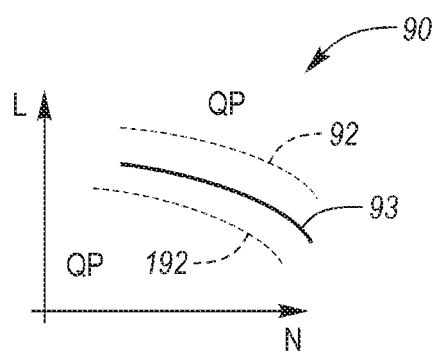
FIG. 5 is a schematic plot of engine speed (horizontal axis) versus load (vertical axis) depicting a nominal switch map for implementing a hybrid solver function using the controller of FIG. 2.

As will be appreciated by one of ordinary skill in the art, a base hybrid solver may use optimization such as convex optimization, quadratic programming (QP), or mixed-integer quadratic programming (MIQP). For convex solutions sets J(u,δ) in which δ∈{0,1}, such as depicted in FIG. 4, an optimized solution may be represented by point ($P_{OPT}$).

The dwell-time feature may include triggering a hybrid solver function around a nominal or default mode switch line 93, with such an option possibly reducing computational burden and improving throughput of the controller 50 when executing the functions of RTO module 56. For instance, a hybrid solver may use a map 90 of FIG. 5 which depicts a load (L) on the vertical axis and engine speed (N) on the horizontal axis. The nominal mode switch line 93 may be programmed into memory of the controller 50 and bounded as shown by dashed lines 92 and 192 to provide a zone in which the base hybrid solver, e.g., MIQP, may be used. Outside of the dashed lines 92 and 192, a less computationally burdensome optimization technique such as convex QP may be used.

The third option noted above, i.e., round-off, may be used to enjoy a substantial throughput savings. Using such an approach, the controller 50 could treat the discrete mode, e.g., $n_{cyl}$, as a continuous function, and thereafter use convex QP across the entire range of the solution set to find an optimal value (without constraining it to be discrete) and to also truncate the resulting optimal value to the closest possible value for application as the discrete mode input.

In another variation, the possible-finite set of forward-looking discrete mode combinations may be enumerated together with identifying the corresponding convex quadratic programming (QP) solutions of the continuous actuators for each possible mode sequence. The solution of the continuous input and discrete mode combination of the lowest cost is then determined as a final control input. By way of example, consider the case of two possible discrete modes, such as the number of active cylinders $n_{cyl}$. With a prediction horizon of size N, there are $2^N$ possible ways that a mode☐change sequence can occur. Enumeration in this context means, for both cases, running QP for the remaining continuous actuators and selecting the solution with the lowest QP result. Two QPs are run with only continuous actuators trying all possible mode combinations, which is two in this example illustration, e.g., $n_{cyl}=\{2\text{ or }4\}$ if N=1 as an example. Running QP1 gives the first solution (U1) when the number of continuous actuators with the lowest cost assumes $n_{cyl}=2$. QP2 gives the second solution (U2) when the number of continuous actuators with the lowest cost assumes $n_{cyl}=4$. If QP2 is less than QP1, the overall optimal solution would be solution U2.

Figure 6A:
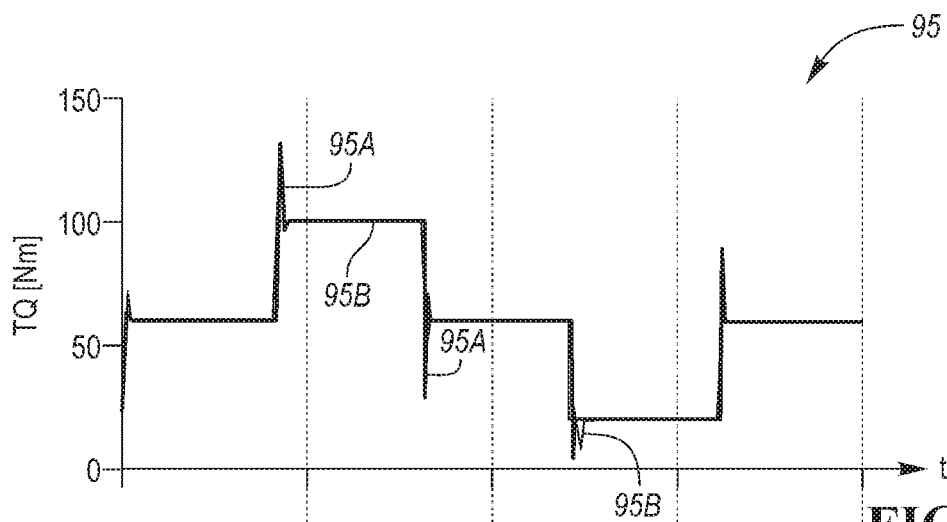
FIGS. 6A, 6B, and 6C are example time plots of engine torque (FIG. 6A), cylinder fuel consumption (FIG. 6B), and number of active cylinders (FIG. 6C) with and without implementation of the present control architecture.
Figure 6B:
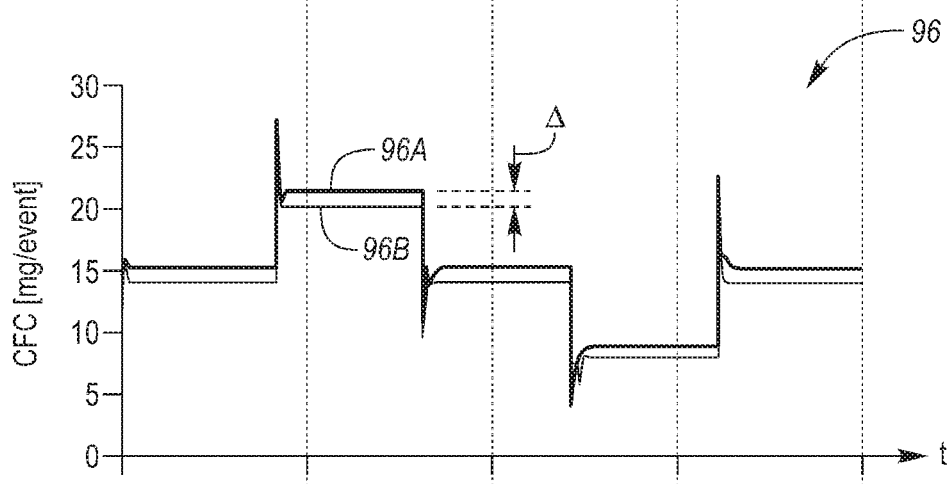
Figure 6C:
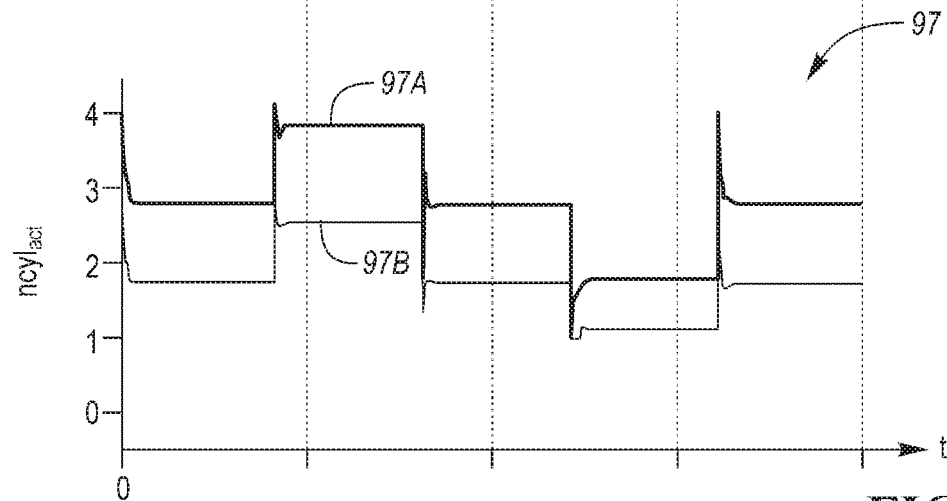

An application of the above-described controller 50 and its programmed control logic 50L of FIG. 2 is depicted in the time plots 95, 96, and 97 of FIGS. 6A-C, respectively, for torque delivery (FIG. 6A), fuel consumption (FIG. 6B), and number of cylinders $n_{cyl}$ (FIG. 6C), with time (t) depicted on the horizontal axis. As a whole, FIGS. 6A-C depict improved fuel economy when selectively deactivating some of the cylinders 12C of the engine 12 shown in FIG. 1 while providing essentially the same torque. The decision in this instance as to precisely when to deactivate cylinders 12C is performed autonomously by the controller 50 using the control logic 50L of FIG. 2. The actual number of active cylinders ($n_{cyl,act}$) are depicted in FIG. 6C, with trace 97A showing more fired cylinders 12C relative to trace 97B.

In FIG. 6A, engine torque (TQ), corresponding to the engine torque ($T_{12}$) of FIG. 1, is represented in Newton-meters (Nm) on the vertical axis, with traces 95A and 95B respectively representing torque delivery of the engine 12 with all cylinders 12C fired (trace 95A) and fewer than all active cylinders 12C (trace 95B). Traces 95A and 95B overlap, which indicates that the controller 50 maintains torque of the engine 12 of FIG. 1 with fewer active cylinders 12C.

In FIG. 6B, cylinder fuel consumption (CFC) in milli-grams of fuel per compression event is represented on the vertical axis, with traces 96A and 96B respectively representing torque delivery of the engine 12 with all cylinders 12C fired (trace 96A) and fewer than all cylinders 12C fired (trace 96B). As captured by the difference or delta ($\Delta$) between traces 96A and 96B, and as would be expected, fuel consumption is reduced due to fewer fired cylinders 12C.

From the above disclosure one of ordinary skill in the art will appreciate that a method is enabled for controlling multiple continuous actuators to achieve a discrete mode of operation in a system. For instance, a desired output state of the powertrain system 24 or vehicle 10 of FIG. 1 may be requested by a user or autonomously by providing a control input set for the continuous actuators to a dynamical pre-dictive model of the controller 50, which then determines a set of possible control solutions for achieving the desired output state at a future time point, e.g., N seconds in the future. A cost function logic block then identifies, from among the set of possible control solutions, a lowest oppor-tunity cost control solution for executing the discrete mode of operation at the future time point, e.g., in terms of fuel economy or engine torque performance. The lowest oppor-tunity cost control solution is processed through a real-time optimization logic block to determine a locally optimized solution for executing the discrete mode of operation, such as a number of active cylinders 12C of FIG. 1 to fuel and fire, and then executing the optimized solution as the optimal solution when transitioning the system to the discrete mode of operation at the future time point.

As set forth above, the control logic 50L of FIG. 2 may be used in lieu of ad-hoc or prescheduled switching between discrete modes. The integrated model-based design estab-lishes a dynamic, predictive control framework in which discrete switching is decided and utilized in coordination with control of continuous actuators. Using a calibratable window to forecast a calibrated time interval into the future, e.g., 0.5-2 s, the controller 50 is able to use current perfor-mance values and a dynamic model to iteratively determine future possible control actions, and to predict system outputs at one or more time steps into the future. Driver demand is converted into dynamic reference values for each continuous actuator, with modification via the prediction model used to forecast and make selections to minimize cost, with a cost associated with each possible control action. A quadratic programming problem is solved in real time at every time step to find the control action having the lowest cost, with the option of using QP or MIQP based on operating point. Also, by predicting into the future, the controller 50 is able to consider the effects of mode changes before they occur, and thereby provide a mechanism for actuators to start preparing for the mode switch.

Whether used to determine timing of a discrete mode transition or to execute such a transition at a predetermined time, the present approach is configured to minimize torque transients that may otherwise result. In this manner, noise, vibration, and harshness may be minimized in the example powertrain 24 of FIG. 1 or other systems, with an accom-panying reduction in the calibration effort for coordinated torque management. These and other benefits will be readily appreciated by one of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the pres-ent disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for controlling multiple continuous actuators in a powertrain system to implement a discrete mode of operation in the powertrain system, the method comprising:
providing a control input set for the multiple continuous actuators to a controller having a dynamical predictive model of the powertrain system, the control input set collectively describing a desired output state of the powertrain system;
processing the control input set via the dynamical predic-tive model, in real time, as a function of a variable vector defining real-time control data and measure-ments to determine a set of possible control solutions for achieving the desired output state of the powertrain system at a calibrated future time point;
identifying, using a cost function logic block of the controller from among the set of possible control solutions, a lowest opportunity cost control solution for executing the discrete mode of operation at the calibrated future time point by minimizing an opportunity cost function while maintaining a predetermined output of the powertrain system;

processing the lowest opportunity cost control solution through a real-time optimization logic block of the controller to determine an optimized solution for implementing the discrete mode of operation; and executing the optimized solution via the controller to thereby transition the powertrain system to the discrete mode of operation at the calibrated future time point.

2. The method of claim 1, wherein the powertrain system includes an internal combustion engine having selective cylinder deactivation functionality, the continuous actuators including a throttle and a fuel injector of the engine, and wherein the discrete mode of operation includes a number of active cylinders of the engine.

3. The method of claim 2, wherein the cost function logic block determines the lowest opportunity cost control solution by minimizing the opportunity cost function based on fuel economy of the engine, and wherein the controller is configured to minimize the number of active cylinders while maintaining torque from the engine, as the predetermined output, at a predetermined level as determined by the control input set.

4. The method of claim 2, wherein identifying the lowest opportunity cost control solution includes evaluating the opportunity cost function with a future torque demand from the engine over a forward-looking prediction horizon that includes the future time point.

5. The method of claim 2, wherein the control input set includes a throttle level, a waste gate position, fuel timing and quantity, and a variable valve timing of the engine.

6. The method of claim 1, wherein the powertrain system includes an internal combustion engine and a transmission connectable to the engine via an input clutch, the continuous actuators include a throttle and a fuel injector of the engine, and the discrete mode of operation includes a gear state of the transmission.

7. The method of claim 1, wherein processing the lowest opportunity cost control solution through the real-time optimization logic block includes using a hybrid solver method selected from a group consisting of: convex optimization, quadratic programming, and mixed-integer quadratic programming.

8. The method of claim 7, wherein the hybrid solver method selects the convex optimization, the quadratic programming, or the mixed-integer quadratic programming based on a load and a speed of the powertrain system.

9. The method of claim 1, wherein processing the lowest opportunity cost control solution through the real-time optimization logic block includes using a round-off feature in which the controller uses convex quadratic programming across an entire range of the set of possible control solutions to find an optimal solution, and truncates the optimal solution to a closest-possible value, and uses the closest-possible value as the optimized solution to execute the discrete mode.

10. The method of claim 1, wherein processing the lowest opportunity cost control solution through the real-time optimization logic block includes enumerating a possible solution set together with identifying corresponding convex quadratic programming solutions of the continuous actuators for each possible mode sequence to determine the optimized solution for implementing the discrete mode of operation.

11. A powertrain system having discrete modes of operation, the powertrain system comprising:
an internal combustion engine;
a transmission assembly connectable to the internal combustion engine to receive therefrom output torque;
multiple continuous actuators configured to achieve the discrete modes of operation; and
a controller configured to:
determine a control input set for the multiple continuous actuators indicative of a desired output state of the powertrain system, the control input set including a desired torque and/or a desired speed for the internal combustion engine;
process the control input set via a dynamical predictive model as a function of a variable vector defining real-time control data and measurements to thereby determine a set of possible control solutions for achieving the desired output state of the powertrain system at a calibrated future time point;
identifying, via a cost function logic block from among the set of possible control solutions, a lowest opportunity cost control solution for executing one or more of the discrete modes of operation at the calibrated future time point by minimizing an opportunity cost function while maintaining an engine torque of the internal combustion engine;
process the lowest opportunity cost control solution through a real-time optimization logic block to determine an optimized solution for the one or more of the discrete modes of operation; and
execute the optimized solution to thereby transition the powertrain system to the one or more of the discrete modes of operation at the calibrated future time point.

12. The powertrain system of claim 11, wherein the internal combustion engine includes a plurality of cylinders and has selective cylinder deactivation functionality, wherein the continuous actuators include a throttle and a fuel injector of the internal combustion engine, and wherein the discrete modes of operation include a number of active cylinders of the internal combustion engine.

13. The powertrain system of claim 12, wherein the cost function logic block determines the lowest opportunity cost control solution by minimizing the opportunity cost function based on fuel economy of the internal combustion engine, and the controller is configured to minimize the number of active cylinders of the internal combustion engine while maintaining torque from the internal combustion engine, as the predetermined output, at a predetermined level.

14. The powertrain system of claim 12, wherein identifying the lowest opportunity cost control solution includes evaluating the cost function with a future torque demand of the internal combustion engine for a forward-looking prediction horizon inclusive of the calibrated future time point.

15. The powertrain system of claim 12, wherein the control input set includes a level of the throttle, a waste gate position of the internal combustion engine, a fuel timing and quantity value of the internal combustion engine, and a variable valve timing value of the internal combustion engine.

16. The powertrain system of claim 11, wherein the transmission includes a plurality of gears and is connectable to the internal combustion engine via an input clutch, and wherein the discrete mode of operation includes a gear state of the transmission.

17. The powertrain system of claim 11, wherein the real-time optimization logic block utilizes a hybrid solver methodology selected from a group consisting of: convex optimization, quadratic programming, and mixed-integer quadratic programming.

18. The powertrain system of claim 17, wherein the hybrid solver methodology selects from between the convex optimization, the quadratic programming, and the mixed-integer quadratic programming based on a load and a speed of the powertrain system.

19. The powertrain system of claim 11, wherein the real-time optimization logic block includes a round-off feature in which the controller uses convex quadratic programming across an entire range of the set of possible control solutions to find an optimal solution, truncates the optimal solution to a closest-possible value, and uses the closest-possible value as the optimized solution to execute the discrete mode.

20. The powertrain system of claim 11, wherein the controller is configured to process the lowest opportunity cost control solution through the real-time optimization logic block by enumerating a possible solution set together with identifying corresponding convex quadratic programming solutions of the continuous actuators for each possible mode sequence to determine the optimized solution for implementing the discrete mode of operation.

* * * * *